(12) United States Patent
Kempshall

(10) Patent No.: US 9,623,954 B2
(45) Date of Patent: Apr. 18, 2017

(54) HYBRID LIGHTER-THAN-AIR VEHICLE

(71) Applicant: Scott R. Kempshall, St. Petersburg, FL (US)

(72) Inventor: Scott R. Kempshall, St. Petersburg, FL (US)

(73) Assignee: Hyalta Aeronautices, Inc., St. Petersburg, FL (US)

( * ) Notice: Subject to any disclaimer, the term of this patent is extended or adjusted under 35 U.S.C. 154(b) by 166 days.

(21) Appl. No.: 14/341,184

(22) Filed: Jul. 25, 2014

(65) Prior Publication Data

US 2016/0023748 A1    Jan. 28, 2016

(51) Int. Cl.
| | |
|---|---|
| B64B 1/20 | (2006.01) |
| B64C 3/44 | (2006.01) |
| B64B 1/08 | (2006.01) |
| B64B 1/14 | (2006.01) |
| B64C 3/54 | (2006.01) |
| B64B 1/58 | (2006.01) |
| F03D 9/00 | (2016.01) |

(52) U.S. Cl.
CPC .......... *B64C 3/44* (2013.01); *B64B 1/08* (2013.01); *B64B 1/14* (2013.01); *B64B 1/58* (2013.01); *B64C 3/54* (2013.01); *F03D 9/002* (2013.01); *B64B 2201/00* (2013.01); *F05B 2240/921* (2013.01); *Y02E 10/725* (2013.01)

(58) Field of Classification Search
CPC ......... B64B 1/00; B64B 2201/00; B64B 1/20; B64B 1/06; B64B 1/58; B64B 1/14; B64B 1/26; B64C 1/34; B64C 39/10; B64C 3/30; B64C 2700/6273; B64C 3/10; B64C 3/14; B64C 2001/0045; B64C 3/00; B64C 1/064; B64C 2201/105; B64C 25/56; B64C 3/44; B64C 3/56
USPC .................................................. 244/5
See application file for complete search history.

(56) References Cited

U.S. PATENT DOCUMENTS

| | | |
|---|---|---|
| 3,907,218 A | 9/1975 | Miller |
| 3,913,871 A | 10/1975 | Miller |
| 3,970,270 A | 7/1976 | Pittet, Jr. |
| 3,976,265 A | 8/1976 | Doolittle |
| 3,993,268 A | 11/1976 | Moore |
| 4,052,025 A | 10/1977 | Clark et al. |
| 4,085,912 A | 4/1978 | Slater |
| 4,102,519 A | 7/1978 | Crosby, Jr. |
| 4,261,534 A | 4/1981 | Roselli |
| 4,366,936 A | 1/1983 | Ferguson |
| 4,482,110 A | 11/1984 | Crimmins, Jr. |

(Continued)

*Primary Examiner* — Valentina Xavier
*Assistant Examiner* — George Andonyan
(74) *Attorney, Agent, or Firm* — Nicholas Pfeifer; Smith & Hopen, P.A.

(57) ABSTRACT

The present invention is a variable geometry lighter-than-air (LTA) aircraft that is adapted to morph its shape from a symmetric cross-section buoyant craft to an asymmetric lifting body and even to a symmetric zero lift configuration. The basic structure is a semi rigid airship with movable longerons. Movement of the longerons adjusts the camber of the upper and/or lower surfaces to achieve varying shapes of the lifting-body. This transformation changes both the lift and drag characteristics of the craft to alter the flight characteristics. The transformation may be accomplished while the craft is airborne and does not require any ground support equipment.

12 Claims, 16 Drawing Sheets

(56) References Cited

U.S. PATENT DOCUMENTS

| | | | |
|---|---|---|---|
| 4,497,272 A | | 2/1985 | Veazey |
| 4,695,012 A | | 9/1987 | Lindenbaum |
| 4,779,825 A | | 10/1988 | Sams |
| 5,005,783 A | | 4/1991 | Taylor |
| 5,823,468 A | * | 10/1998 | Bothe ................ B64B 1/08 244/12.3 |
| 2004/0084565 A1 | * | 5/2004 | Albrecht ............ B64B 1/20 244/5 |
| 2011/0163198 A1 | * | 7/2011 | Leaver .............. B64C 27/20 244/12.1 |

* cited by examiner

FIG. 7

HYBRID LIGHTER-THAN-AIR VEHICLE

BACKGROUND OF THE INVENTION

1. Field of the Invention

This invention relates, generally, to aircrafts. More specifically, it relates to aircrafts convertible between lighter-than-air and heavy-than-air configurations.

2. Brief Description of the Prior Art

Lighter-Than-Air (LTA) aircrafts have some characteristics not shared with Heavier-Than-Air (HTA) aircrafts in that they can maintain altitude without moving in a medium and can do so as long as buoyancy is maintained. LTA aircrafts use low-density gas, such as helium or hydrogen to float in higher density air. These aircrafts usually employ one or more gasbags filled with low-density gas to create a buoyancy force that offsets the weight of the aircraft. The downside of LTA aircrafts is their large size, which is accompanied by large drag characteristics, preventing them from traveling at higher speeds. The current speed record for an LTA aircraft is 112 Km/hr (69.6 mph).

HTA aircrafts use Newton's third law and Bernoulli's principle to achieve flight. These aircrafts are generally fixed wing or rotor wing aircraft. In either case, part or parts of the structure (e.g., wing, rotors, propellers, fuselage, and control surfaces) have a characteristic shape called an airfoil. Airfoils are generally asymmetric in cross-section with the upper surface having a greater length than the lower surface. This causes air moving across the upper surface to travel faster than the air traveling across the lower surface causing a pressure decrease on the upper surface resulting in lift.

Lift can also be achieved/altered by altering the angle of attack (AoA) of an airfoil relative to the oncoming airflow. Increased AoA causes mass deflection resulting in lift (Newton's third law). Generally, increasing AoA increases lift until the angle reaches a point at which the airflow separates from the surface of the airfoil causing aerodynamic stall.

Regardless of means for creating lift, an HTA requires a wing-like structure moving through a fluid. Movement requires a power source and no power source can last indefinitely. Therefore, the HTA aircrafts can only maintain flight for limited periods of time. Even powerless gliders have duration limits as they trade airspeed for altitude gained from thermal lift. The limitation in flight time of an HTA aircraft, however, is compensated by low drag characteristics and thus, high-speed flight.

The clear tradeoff between LTA and HTA aircrafts is speed verse indefinite flight. An ideal aircraft would have the ability of an LTA to hover, or station-keep, for extended periods for observation or surveillance roles and also the ability of an HTA to operate at high-speeds. This can theoretically be achieved through an aircraft convertible between an LTA and an HTA configuration. Currently, there exist hybrid convertible aircrafts, but none that provide a unique combination of attributes of both a fixed wing aircraft and a LTA craft allowing for indefinite mission durations, low energy station keeping, and the ability to dash at relatively high velocities.

U.S. Pat. No. 5,005,783 to James D. Taylor teaches a variable geometry airship capable of converting between a LTA and HTA airship. However, the airship is operationally complex and does not extend the operating range sufficiently to be practical as shown in Table 1. Along with multiple other pitfalls, the shape and design of this airship prevents the airship from transforming into both a symmetric neutral lift configuration and a negative lift configuration, thereby reducing the effectiveness of the airship.

U.S. Pat. No. 4,102,519 to Edward L. Crosby, Jr. teaches a variable lift inflatable airfoil. However, this invention lacks internal moveable structures, which prevent the airfoil from achieving multiple configurations. Additionally, the airfoil lacks a propulsion system and/or control surfaces.

Accordingly, what is needed is an improved variable geometry aircraft having a simple, moveable internal structure to easily convert the aircraft between an LTA configuration and an HTA configuration. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved variable geometry aircraft having simple, moveable internal structure to easily convert the aircraft between a lighter-than-air configuration and a heavier-than-air configuration is now met by a new, useful, and nonobvious invention.

The novel structure includes a convertible design having a lighter-than-air configuration and a heavier-than-air configuration with a flexible envelope in communication with a base structure. The flexible envelope has a leading edge and a trailing edge creating a chord line. The aircraft also has a span extending from a port side wingtip to a starboard side wingtip. The lighter-than-air configuration has a span that is less than the span of the aircraft when in the heavier-than-air configuration.

The base structure includes a central core, a port side outrigger, and a starboard side outrigger. In an embodiment, the novel structure further includes moveable longerons, and length adjusting envelope expansion arms (also referred as "slack managers") for varying the span of the aircraft. In a certain embodiment, the aircraft may include a propulsion system.

In addition to the central core running along a central longitudinal axis of the aircraft, the base structure includes a leading edge strut extending in a direction perpendicular to and in communication with the central core, a trailing edge strut extending in a direction perpendicular to and in communication with the central core. The port side outrigger extends in a direction parallel to the central core and is in communication with the struts, and the starboard side outrigger extends in a direction parallel to the central core and in communication with the struts. Additionally, the base structure is in communication with the moveable longerons and the envelope expansion arms.

The moveable longerons include upper and lower longerons. The upper longerons are in communication with the flexible envelope and an upper translation assembly. In an embodiment, the upper translation assembly has an extended configuration where the moveable longerons are in a high camber orientation and a retracted configuration where the upper moveable longerons are in a low camber orientation. In transitioning to the retracted configuration, the upper translation assembly pulls the upper moveable longerons inward towards the central longitudinal axis of the aircraft to decrease aircraft thickness. In transitioning to the extended configuration, the upper translation assembly pushes (or pulls in the case of the strap type translation assembly) the moveable longerons outward away from the central longitudinal axis of the aircraft to place the upper moveable longerons in a more vertical orientation, which increases the aircraft thickness, compared to longeron's orientation in the retracted configuration.

Similarly, the lower longerons are in communication with the flexible envelope and a lower translation assembly. The lower translation assembly has an extended configuration where the moveable longerons are in a high camber orientation and a retracted configuration where the lower moveable longerons are in a low camber orientation. In transitioning to the retracted configuration, the lower translation assembly pulls the lower moveable longerons inward towards a central longitudinal axis of the aircraft to decrease aircraft thickness. In transitioning to the extended configuration, the lower translation assembly pushes the moveable longerons outward away from the central longitudinal axis of the aircraft to place the lower moveable longerons in a more vertical orientation, which increases the aircraft's thickness, compared to longeron's orientation in the retracted configuration.

The upper and lower moveable longerons each include a port side longeron and a starboard side longeron, wherein each longeron has a generally airfoil or arc shape and a predetermined length that extends in generally the same direction as the central longitudinal axis of the aircraft. Moreover, the moveable longerons are in a generally vertical orientation when in the high camber position and in an acute angle orientation when in the low camber position.

The length-adjusting envelope expansion arms comprise of a port side envelope expansion arm and a starboard side envelope expansion arm. Each arm has a generally arc shape, is subjected to a bias force attempting to force each arm in a direction away from the central longitudinal axis of the aircraft resulting in an increased arc shape, and is in communication with the flexible envelope. Additionally, each envelope expansion arm has a retracted position and an expanded position, where in the retracted position, the length and arc of the envelope expansion arm is at a minimum and in the expanded position, the length and are of the envelope expansion arm is at a maximum. The retracted position is achieved when a tension force in the flexible envelope overcomes the bias force, resulting from the transition of the moveable longerons towards a more vertical orientation, thereby reducing the length and arc of the envelope expansion arm. Contrastingly, the expanded position is achieved when the tension force in the flexible envelope is overcome by the bias force, resulting from the transition of the moveable longerons to a more horizontal orientation, thereby increasing the length and arc of the envelope expansion arm. Due to the positioning of the envelope expansion arms, the span of the aircraft is directly affected by the transition between the retracted position and the extended position.

In a certain embodiment, the envelope expansion arm is an anisotropic beam having two or more composite rods with cross members extending between the rods. The cross members are designed to have a predetermined spring constant embedded into the structure. One of the composite rods is pivotally attached to the aircraft and one or more of the composite rods are anchored against the pivot structure to provide a source of the tension.

The novel structure further includes a structural connection point to connect the base structure with the moveable longerons and the envelope expansion arms. The structural connection point has a first fixed connection attached to an outrigger, a second fixed connection attached to a strut, a first pivoting connection attached to one of the upper moveable longeron, a second pivoting connection attached to one of the lower moveable longeron, and a third pivoting connection attached to one of the envelope expansion arms.

In an embodiment, the aircraft uses a gas storage and retrieval system adapted to house, distribute, and retrieve lighter-than-air gas. This system allows the aircraft to easily convert between a lighter-than-air configuration and a heavier-than-air configuration multiple times without having to refill on gas.

In an embodiment, the aircraft includes a propulsion system that includes an electrical generator system adapted to convert wind energy into electrical energy while the aircraft is in the lighter-than-air configuration. In a certain embodiment, flexible solar panels are attached to an exterior surface of the envelope to retrieve and convert solar energy into electrical energy to extend mission time.

In an embodiment, the aircraft has a payload hard point attached to the lower translation assembly to facilitate the attachment and management of external payloads in addition to payloads attached internally to the core structure.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

Figure 7:
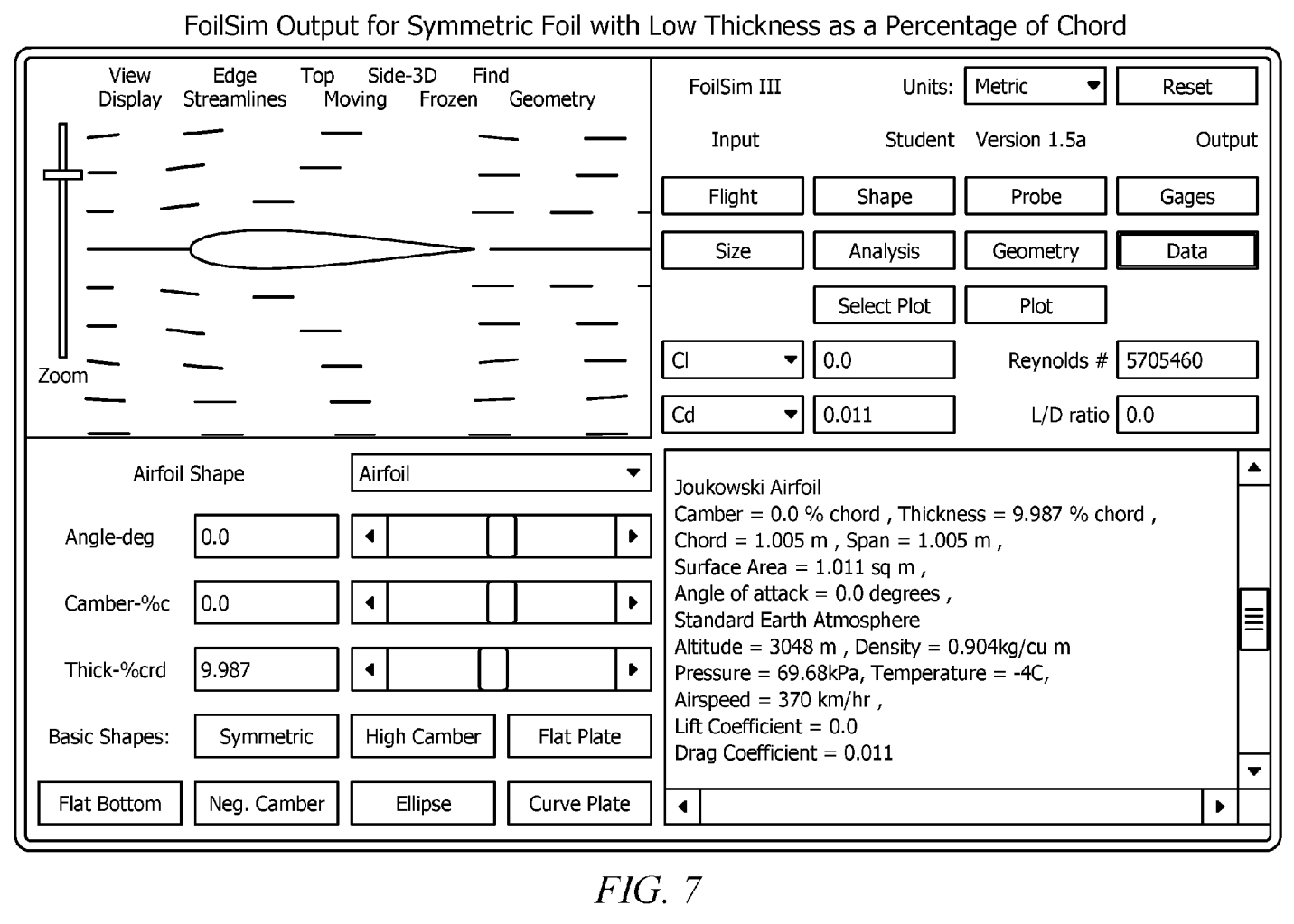

FIG. 7 is a captured output for a symmetric airfoil with low thickness as a percentage of chord that was achieved using FoilSim software.

DETAILED DESCRIPTION OF THE INVENTION

Figure 1:
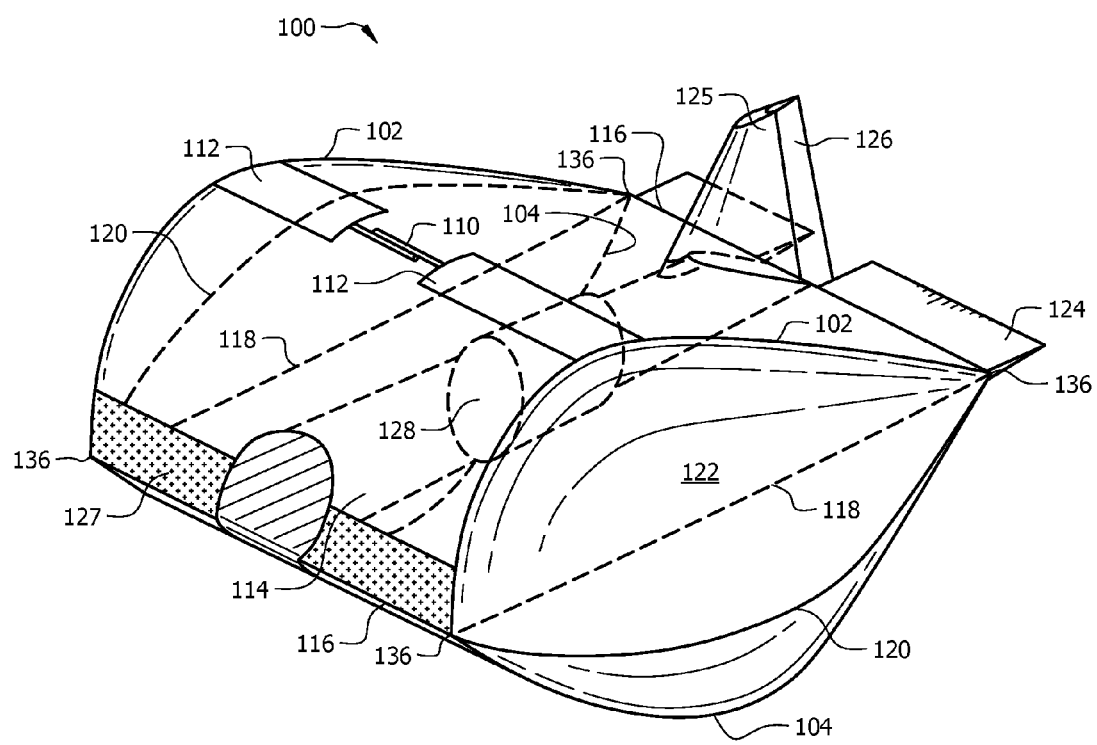
FIG. 1 is a perspective view of a certain embodiment of the present invention in an LTA configuration.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Envelope: is a lightweight flexible material.

Chord Line: is a straight line extending between the leading edge and trailing edge of the envelope.

Heavier-Than-Air Configuration: is a configuration of the aircraft that cannot maintain altitude without moving through a medium to create Bernoulli lift, changing the angle of attack, or providing vertical thrust.

Lighter-Than-Air Configuration: is a configuration of the aircraft that has a buoyancy to weight ratio greater than 1:1.

Longeron: is a buoyant member of the aircraft.

Outrigger: is a rod or bar forming part of a framework and designed to resist compression that extends in generally the same direction as the longitudinal axis of the aircraft.

Payload Hard Point: is an attachment point for payloads or instruments carried on the aircraft.

Propulsion System: is a system capable of moving the aircraft through a medium.

Strut: is a rod or bar forming part of a framework and designed to resist compression.

The present invention is a variable geometry aircraft capable of morphing its shape from a buoyant craft having a symmetric cross-section to an asymmetric lifting body configuration or to a low camber symmetric shape. The convertibility of the present invention provides a unique combination of attributes of both a fixed wing HTA aircraft and a LTA aircraft allowing indefinite mission durations, low energy station keeping and the ability to glide or dash at relatively high velocities when equipped with a propulsion system (the term "dash" herein refers to this high speed mode where the aircraft has a symmetric, low coefficient of drag configuration). Additionally, the aircraft is highly portable by folding into a transportable configuration, light weight, relatively silent in operation, inexpensive to produce and operate, and has a unique structure that allows it to operate even if the gas envelope is penetrated. Although there are numerous other aircraft technologies, this device can operate across a number of operating envelopes and performs multiple roles very well without significant compromise (see Table 1 below). This ability is facilitated by the unique internal structural elements of the aircraft.

TABLE 1

Table 1: Aircraft Comparison

| Aircraft | Velocity Range (kts) | Operating Cost | Complexity | Operational Duration |
|---|---|---|---|---|
| Rotor/VTOL | 0-115 (217*) | High | High | Low |
| Fixed Wing | 50+ | Low-High | Low-Med | Low |
| LTA | 0-30 (60*) | Low | Low-Med | High |
| Hybrid LTA** | 0-40 | High | High | Med |
| Present Invention | 0-200 | Low | Low | High |

*World Record
**Only viable recorded device defined in Patent 5,005,783

Table 1 above illustrates that the present invention fills a unique performance niche in that, with low complexity and high reliability, a unique and broad range of performance feats can be achieved. The unique design features of the present design, taken in combination, make it an improvement on the technology for LTA aircraft, hybrid LTA aircraft, and fixed wing flying bodies, especially as applied to unmanned vehicles.

The present invention includes a flexible envelope enclosing a variable rigid inner structure. The envelope may include internal bladders adapted to contain low-density buoyant gas, such as Helium.

In an embodiment, the novel structure includes a central, tubular core containing a propulsion system. The propulsion system is preferably an electric ducted fan motor. An embodiment may include several cores depending on the size of the aircraft and the mission requirements. In an embodiment, such as a non-powered glider version, the core(s) serves as the structural backbone for the envelope while also acting as gas tank(s). The core further provides attachment points for additional equipment and may serve as a lead component in adjusting the aircraft's chord length.

The core(s) can also serve as a key structural base for a dual outrigger configuration to support the leading and trailing edges. The two outriggers are preferably generally parallel to the core and attach at the ends of the leading and trailing edge struts. The outriggers provide structure as well as an attachment point for mounting the moveable longerons.

The moveable longerons are adapted to pivot between a more vertical orientation and more horizontal orientation such that the camber and thickness of the aircraft can be altered based on flight needs. The chamber adjustment assemblies (also referred to as translation assemblies) can be mounted both above and below the core of the aircraft such that both the top and bottom surfaces of the aircraft are variable.

When the aircraft is in the LTA configuration—typically a large buoyant shape, the craft has all of the traditional characteristics of a blimp for station keeping or slow speed flight. By adjusting the shape of the lower surface to achieve an airfoil shape, the craft can augment the buoyancy by creating aerodynamic lift to increase its duration of flight or act as a conventional unpowered glider. Finally, by reshaping both the upper and lower surfaces, the craft can achieve a relatively low drag configuration for high velocity (in excess of 200 km/hr for smaller aircraft sizes) to rapidly reposition itself or fly high velocity missions. In a certain embodiment, the design includes a leading edge shield to protect the envelope in high velocity flight.

The aircraft includes one or more gas containers coupled to a gas delivery and preferably retrieval system. The gas delivery system fills the internal volume of the flexible envelope with lighter than air gas, while the retrieval system is adapted to recover any gas already contained in the internal volume of the flexible envelope. These two systems allow for easy transformation between the LTA and HTA configurations.

Example of the Present Invention

As shown in FIG. 1, an embodiment of the present invention, generally denoted by reference numeral 100, includes flexible envelope 122 with movable longerons 102, 104. Aircraft 100 has two moveable upper longerons 102 and two moveable lower longerons 104. The movement of the longerons adjusts the camber and thickness of the upper and/or lower surfaces to achieve differing body shapes. The longerons are non-linear, preferably having an arc shape. In addition, the longerons preferably have a fixed length to decrease complexity of the aircraft, however, length-adjusting longerons are considered. The length of the longerons extends preferably in a direction generally parallel to the longitudinal axis of the aircraft.

The movement of the longerons and therefore camber-transformation can be accomplished while the craft is airborne and does not require any ground support equipment. The transformation changes both the lift and drag characteristics of the craft to alter the flight characteristics. In a certain embodiment, only the upper or only the lower longerons are moveable to decrease the complexity and weight of the aircraft.

Moveable upper longerons 102 and moveable lower longerons 104 are each in communication with upper translation assembly 106 and lower translation assembly 107, respectively. The translation assemblies each include motor 108 (see FIGS. 16-21), gear assembly 110, and extendable arms 112. When the translation assembly is in a fully extended configuration, the moveable longerons are in a generally vertical orientation, as shown in FIGS. 1 and 17A, which increases the camber and affects the lift and drag characteristics of the aircraft. When the translation assembly is in a retracted position, the moveable longerons are pulled inwards towards the longitudinal axis of the aircraft, as shown in FIGS. 2, 5B, 5D, and 17B, which decreases camber and thickness.

The additional structural components contributing to the present invention's superior functionality include cylindrical core 114 extending the length of the aircraft in the longitudinal direction. In addition to the core, is a rigid, preferably rectangular, base structure. The base structure includes leading and trailing edge struts, collectively denoted by reference numeral 116, connected to port and starboard outriggers, which are collectively denoted by reference numeral 118. The design also includes envelope expansion arms (also referred to as "slack managers") 120 having an adjustable length and a generally arc shape. There is preferably one envelope expansion arm along the port side of the aircraft and one along the starboard side of the aircraft where each is capable of extending outward away from the central longitudinal axis of the aircraft to alter the span of the aircraft. As shown in FIGS. 1-5, flexible envelope 122 encloses the base structure, envelope expansion arms, and longerons.

The moveable longerons, envelope expansion arms, and flexible envelope allow the aircraft to operate in various configurations. The position of the longerons is not limited to the fully extended or fully retracted position. Rather, the longerons can be configured in any state of extension to achieve optimal aerodynamic performance to meet a particular mission's requirements. At one extreme, the longerons can be positioned to transform the aircraft into a symmetric buoyant configuration, as is typical for LTA aircraft, and shown in FIGS. 1, 4, and 5. This configuration includes both upper translation assembly 106 and lower translation assembly 107 in the fully extended position to place moveable upper longerons 102 and lower longerons 104 in a generally vertical orientation. The non-linear arc shape of the longerons increases the thickness of the aircraft when in a more vertical orientation.

Figure 2:
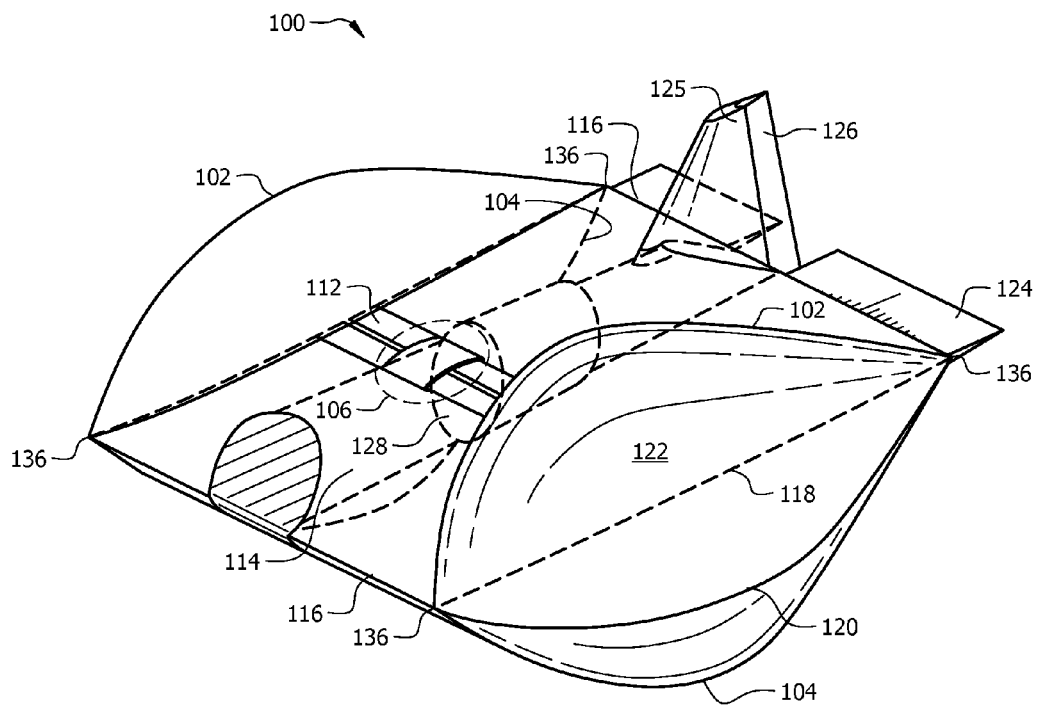
FIG. 2 is a perspective view of an embodiment of the present invention in a negative lift configuration.
Figure 3:
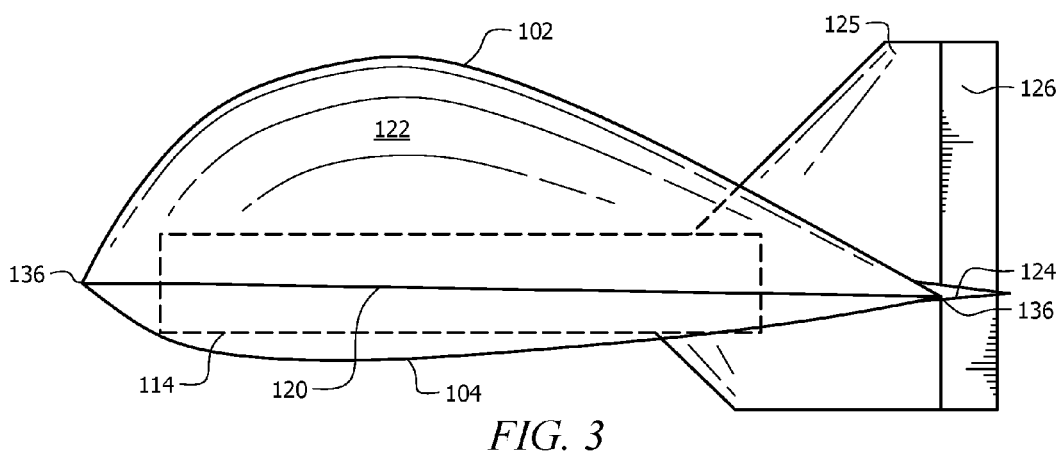
FIG. 3 is a side view of an embodiment of the present invention shown in a positive lift configuration.
Figure 4A:
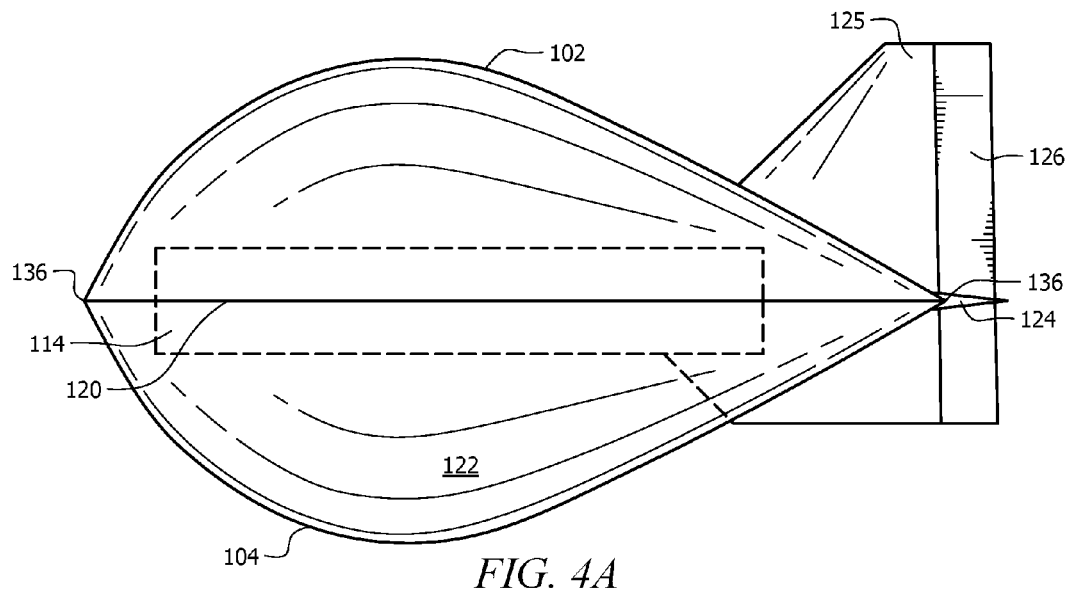
FIG. 4A is a side view of the present invention in an LTA configuration.
Figure 4B:
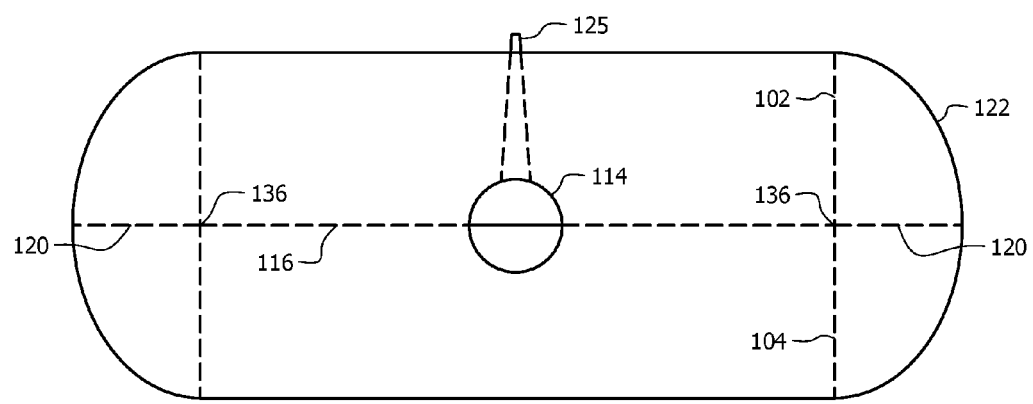
FIG. 4B is a front view of the present invention in an LTA configuration.

Another possible configuration is a negative lift configuration, as shown in FIG. 2. The configuration is achievable by retracting upper translation assembly 106 and extending lower translation assembly 107. Likewise, the aircraft can achieve a positive lift configuration, as shown in FIG. 3, by extending upper translation assembly 106 and retracting lower translation assembly 107.

The truly innovative and functionally distinct orientation found in no other LTA to HTA convertible aircraft, is the dash configuration. As shown in FIGS. 5A-5D, the dash configuration is an approximately symmetric HTA configuration achieved when both upper translation assembly 106 and lower translation assembly 107 are in the retracted position. In this position, the upper and lower moveable longerons 106, 107 are pulled inwardly towards core 114 where they reside in a more horizontal orientation to substantially reduce the thickness and camber of the aircraft.

The variability of the aircraft imposes several requirements on flexible envelope 122. For example, flexible envelope 122 must be flexible to accommodate the shape morphing capability, have a very low permeability to Helium, and be lightweight. As a result, the envelope is preferably made from a plastic sheet material. This material is prone to two negative features that will affect the performance of the LTA in the dash configuration and impact performance overall. One is flutter of the envelope, which increases drag and causes aerodynamic instability. The second is the possibility of penetration of the envelope by airborne hazards (such as insects, birds, or debris) at the high speeds. The possibility of penetration may be avoided by the installation of leading edge shields 127 that are hinged on the leading edge strut and can expand or contract with the movement of the envelope. See FIG. 1. Additionally, mechanical stops can be installed to reflect the shape of the leading edge in the dash configuration to remove the possibility of flutter at high speeds.

Stability and Control Components

Aircraft 100 also includes flight stability and control components, such as elevons 124 (which may be substituted by an elevator/aileron configuration), vertical stabilizer 125, rudder 126, leading edge shield 127, and propulsion system 128. The pair of rear-mounted elevons 124 perform the function of both elevators and ailerons to control pitch and roll. Both are controlled via servos and a microprocessor mounted to the core assembly. Yaw control/directional stability is provided through rudder 126 mounted to vertical stabilizer 125.

An embodiment may include rudder 126 configured to project into the ducted fan airstream to provide a degree of thrust vectoring for very low speed flight and low velocity maneuvering. It is envisioned that the larger sizes of this LTA would employ thrust vectoring entirely as its method of directional control for certain applications. Thrust vectoring with multiple motors and larger sizes would significantly reduce the weight of the aircraft and provide superior maneuvering capability over conventional control surfaces.

Aircraft Performance

Due to the variable geometry capabilities, the aircraft will have a range of performance characteristics spanning from a high Coefficient of Drag ($C_D$) seen in the dirigible configuration to a relatively low $C_D$ seen in the flying wing configuration. The lift characteristics will also vary from a lift neutral symmetric configuration to a positive lift or negative lift airfoil shape to suit mission requirements. These configurations can be changed dynamically while airborne to suit mission needs. The driving requirement for the aircraft is the desired dash speed of approximately 200 kts for small aircraft sizes. The assessment of performance and structural characteristics has been completed for three different configurations of craft defined by the length or chord of the aircraft and the span of the central, airfoil shaped portion of the craft, which excludes the half blimp shape on each end of the craft.

Figure 6:
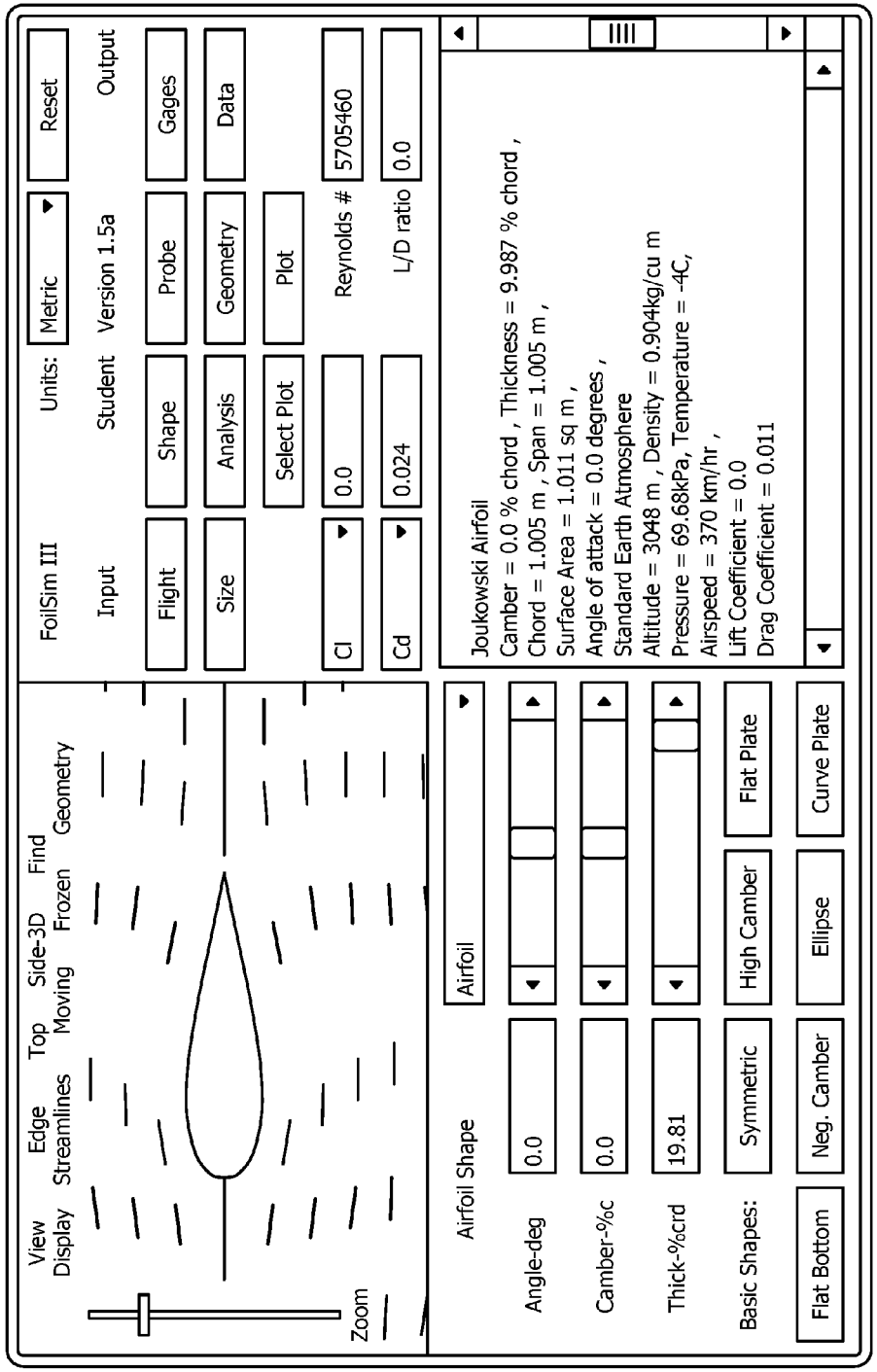
FIG. 6 is a captured output for a symmetric airfoil with high thickness as a percentage of chord that was achieved using FoilSim software.
Figure 8:
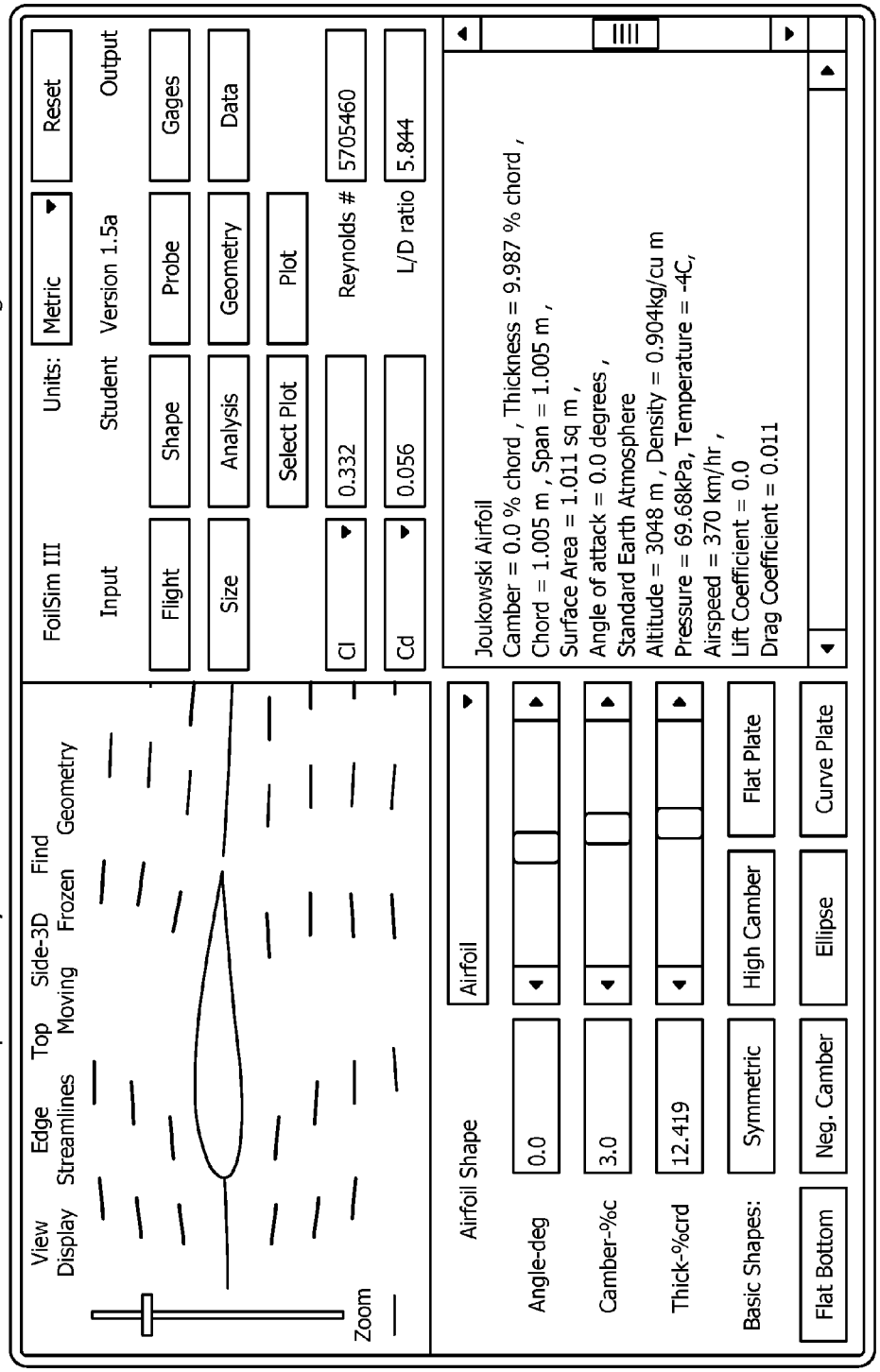
FIG. 8 is a captured output for an asymmetric airfoil with low thickness as a percentage of chord that was achieved using FoilSim software.

Dash Speed Calculation:

A novel characteristic of this aircraft is the speed at which the aircraft is capable of traveling when in the dash configuration and powered by a propulsion system. The equation in Table 2 is used to calculate the amount of force required to move a body through a viscous medium. This is used to derive the motor size to achieve the required speed; thus driving other factors such as weight, power, envelope size, etc. The initial calculation is to determine the minimum motor output required to achieve the desired maximum dash velocity of 230 mph at a cruise altitude of 10,000 feet MSL. Using the desired dash speed shown in Table 2 below, the resultant drag force, or the required motor output to overcome that drag, is determined. Using a mathematical simulation tool (FoilSim) available from NASA, the $C_D$ for various configurations of the aircraft from a large chord to length ratio to a small chord to length ration is calculated. As seen in Table 3, the drag force exhibited by a low chord to length ratio with a highly symmetric profile yields the lowest $C_D$ and therefore, the lowest motor size to achieve the desired speeds. The model output corresponding to this performance is shown in FIG. 7. These values are highlighted in the Drag Coefficient section of Table 3 for each of three configurations shown in FIGS. 6, 7, and 8. Also highlighted in the Drag Force and Required Motor Output sections of Table 3 are the best performance conditions for the LTA dash mode. It is apparent that the maximum LTA speed in the highly buoyant configuration (high thickness to chord length ratios) will be nowhere near those achieved in the dash configuration. FIGS. 6 and 7 show the output for two of the symmetric configurations examined using the FoilSim simulation program. FIG. 8 shows how $C_D$ increases in the asymmetric configuration while also experiencing a corresponding increase in the coefficient of lift ($C_L$). The data shows that in this configuration, significant aerodynamic lift can be achieved by this design at 0 degree AoA. Higher lift performance can be achieved at higher AoA.

TABLE 2

| | | |
|---|---|---|
| Desired speed in knots: | | 200 kys = 102.88 m/sec |
| Fr = .5($C_D$)*$\rho_{air}$*$v^2$*$A_s$ | | Assume Altitude of 10000 ft and Speed of 250 kts |
| | | Altitude 10000 ft = 3048 m |
| | | Speed: 230 mph = 200 kts = 370 km/hr |
| 102.88 | v | Velocity (m/Sec): in this model, this is an input characteristic and drives the motor size. |
| 0.4135 | $\rho_{air}$ | Density of Air: is a function of atmospheric conditions and varies as shown in Table 1 |
| Table | A | Surface Area (m$^2$) |
| Table | $C_D$ | Coefficient of Drag: using FoilSim III |

TABLE 3

| 10000 Ft Standard Lapse | | | | | | | | | |
|---|---|---|---|---|---|---|---|---|---|
| | | | Chord | Drag Coefficient (Co) | | | | | |
| | | | Thickness | 10 | 12 | 14 | 16 | 18 | 20 |
| Chord (m) 1 | Camber | 0 | 0.011 | 0.015 | 0.019 | 0.022 | 0.023 | 0.024 |
| | (% of | | | FIG. 2 | | | | | FIG. 1 |
| Span (m) 1 | Chord) | 1 | 0.016 | 0.02 | 0.024 | 0.027 | 0.029 | 0.03 |
| | | 2 | 0.03 | 0.034 | 0.038 | 0.041 | 0.043 | 0.045 |
| | | 3 | 0.052 | 0.056 | 0.06 | 0.063 | 0.065 | 0.066 |
| | | | | FIG. 3 | | | | | |
| Chord (m) 2 | | 0 | 0.01 | 0.014 | 0.017 | 0.02 | 0.021 | 0.022 |
| Span (m) 2 | | 1 | 0.015 | 0.019 | 0.023 | 0.025 | 0.027 | 0.028 |
| | | 2 | 0.029 | 0.033 | 0.037 | 0.039 | 0.041 | 0.043 |
| | | 3 | 0.051 | 0.054 | 0.058 | 0.061 | 0.063 | 0.064 |

TABLE 3-continued

| Chord (m) | 4 | 0 | 0.01 | 0.013 | 0.016 | 0.018 | 0.02 | 0.021 |
|---|---|---|---|---|---|---|---|---|
| Span (m) | 4 | 1 | 0.015 | 0.018 | 0.021 | 0.024 | 0.025 | 0.026 |
| | | 2 | 0.029 | 0.032 | 0.036 | 0.038 | 0.04 | 0.041 |
| | | 3 | 0.05 | 0.054 | 0.057 | 0.059 | 0.061 | 0.063 |

10000 Ft Standard Lapse

| | | Chord | Drag Force (N) | | | | | |
|---|---|---|---|---|---|---|---|---|
| | | Thickness | 10 | 12 | 14 | 16 | 18 | 20 |
| Chord (m) 1 | Camber | 0 | 24.1 | 32.8 | 41.6 | 48.1 | 50.3 | 52.5 |
| Span (m) 1 | (% of | 1 | 33.0 | 43.8 | 52.5 | 59.1 | 63.5 | 65.6 |
| | Chord) | 2 | 65.6 | 74.4 | 83.2 | 89.7 | 94.1 | 98.5 |
| | | 3 | 113.8 | 122.5 | 131.3 | 137.9 | 142.2 | 144.4 |
| Chord (m) 2 | | 0 | 87.5 | 122.5 | 148.8 | 175.1 | 183.8 | 192.6 |
| Span (m) 2 | | 1 | 131.3 | 166.3 | 201.3 | 218.8 | 236.3 | 245.1 |
| | | 2 | 253.8 | 288.9 | 323.9 | 341.4 | 358.9 | 376.4 |
| | | 3 | 446.4 | 472.7 | 507.7 | 534.0 | 551.5 | 560.2 |
| Chord (m) 4 | | 0 | 350.1 | 455.2 | 560.2 | 630.2 | 700.3 | 735.3 |
| Span (m) 4 | | 1 | 525.2 | 630.2 | 735.3 | 840.3 | 875.3 | 910.3 |
| | | 2 | 1015.4 | 1120.4 | 1260.5 | 1330.5 | 1400.5 | 1435.5 |
| | | 3 | 1750.7 | 1890.7 | 1995.8 | 2065.8 | 2135.8 | 2205.8 |

10000 Ft Standard Lapse

| | | Chord | Required Motor Output (gmf) 1N = 1.02 kgF = .225 lbf | | | | | |
|---|---|---|---|---|---|---|---|---|
| | | Thickness | 10 | 12 | 14 | 16 | 18 | 20 |
| Chord (m) 1 | Camber | 0 | 2455.3 | 3348.1 | 4241.0 | 4910.6 | 5133.8 | 5357.0 |
| Span (m) 1 | (% of | 1 | 3571.4 | 4464.2 | 5357.0 | 6026.7 | 6473.1 | 6696.3 |
| | Chord) | 2 | 6696.3 | 7589.1 | 8482.0 | 9151.6 | 9598.0 | 10044.4 |
| | | 3 | 11606.9 | 12499.7 | 13392.6 | 14062.2 | 14508.6 | 14731.8 |
| Chord (m) 2 | | 0 | 8928.4 | 12499.7 | 15178.3 | 17856.8 | 18749.6 | 19642.5 |
| Span (m) 2 | | 1 | 13392.6 | 16963.9 | 20535.3 | 22321.0 | 24106.7 | 24999.5 |
| | | 2 | 25892.3 | 29463.7 | 33035.0 | 34820.7 | 36606.4 | 38392.1 |
| | | 3 | 45534.8 | 48213.3 | 51784.7 | 54463.2 | 36248.9 | 57141.7 |
| Chord (m) 4 | | 0 | 35713.6 | 46427.6 | 57141.7 | 64284.4 | 71427.1 | 74998.5 |
| Span (m) 4 | | 1 | 53570.3 | 64284.4 | 74998.5 | 85712.5 | 89283.9 | 92855.3 |
| | | 2 | 103569.3 | 114283.4 | 128568.8 | 135711.5 | 142854.2 | 146425.6 |
| | | 3 | 178567.8 | 192853.2 | 203567.3 | 210710.0 | 217852.7 | 224995.4 |

Propulsion System

The motor size and number of motors are derived for each of the three configurations to determine if commercially available Electronic Ducted Fan (EDF) motors can be used in the design. The data in Table 3 proves that a single 3000 gmf motor is sufficient to achieve the desired velocity for the 1-meter-by-1-meter sized aircraft. This size motor is readily available for Radio Control (RC) aircraft. For larger size craft, the number of core units would be increased to provide the required thrust. This assessment shows that two core units of roughly the same size as above will propel a 2-meter-by-2-meter design. Larger motors or core combinations of four motors would be required for the 4-meter-by-4-meter design. In an embodiment, any number and type of motors may be used as is known to a person having ordinary skill in the art.

Envelope

Figure 9:
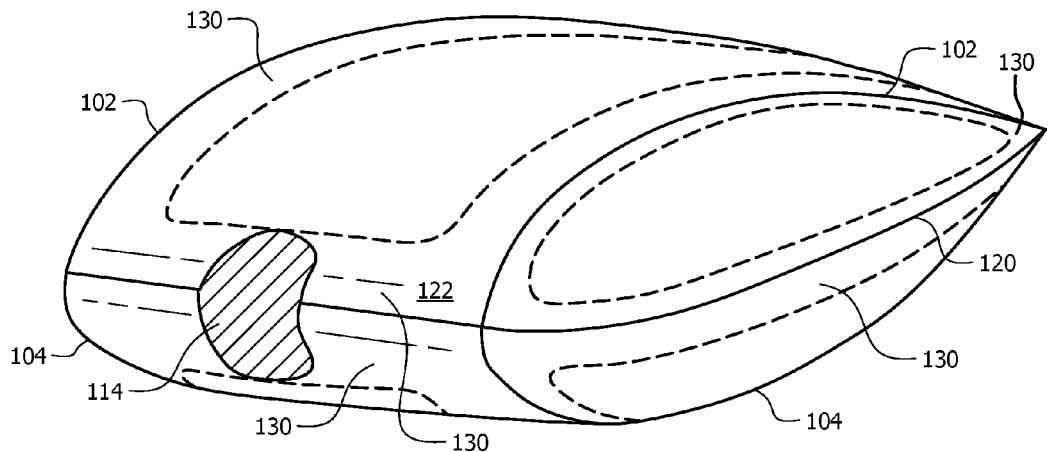
FIG. 9 is a perspective view of a certain embodiment of the present invention illustrating the location of reinforcement layers.

In an embodiment, the envelope includes an internal reinforcement layer and a secondary containment bag to facilitate Helium recovery. The moveable structural components of the aircraft raise concerns regarding structural members rubbing on a fairly thin plastic surface and ultimately causing the envelope to fail. Therefore, an embodiment includes reinforcement layers 130 located in areas likely to experience increased wear and tear from the moveable internal structure of the aircraft. FIG. 9 illustrates the approximate areas on envelope 122 requiring the addition of reinforcement layers 130. Reinforcement layers 130 are made of Mylar or some other wear resistant, lightweight, and flexible material, to increase the serviceable life of the envelope. In an embodiment, the reinforcement layer is also added at the leading edge and under the translation assemblies to improve tear resistance at possible impact areas from outside debris.

Figure 10:
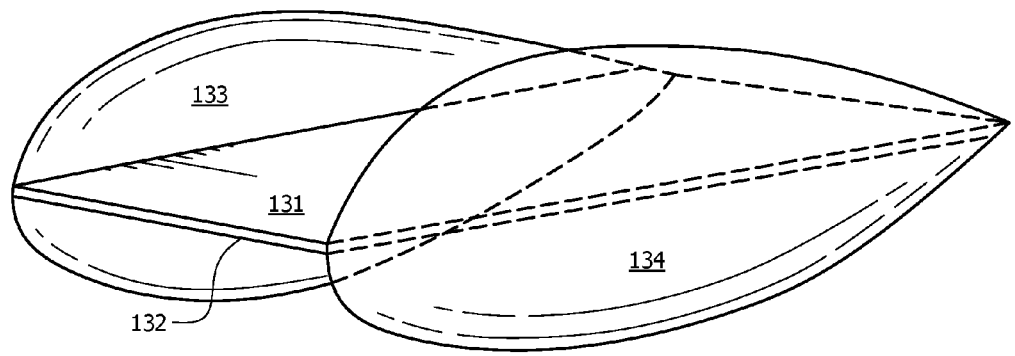
FIG. 10 is a perspective view of a certain embodiment showing the configuration of internal panels used to create compartmentalized gas bladders.

FIG. 10 shows internal panels that create separate gas bladders within the envelope. The internal panels act as flexible walls creating four independent chambers. The internals panels include top panel 131, bottom panel 132, starboard panel 133, and port panel 134. Top panel 131 runs between the outriggers 118 and rests on the central core 114, both of which are not shown to aid in clearly identifying the internal panels. Bottom panel 132 also rims between the outriggers 118, but is located under the central core 114. Both the port and starboard panels 134 and 133 run between the top and bottom longerons 102, 104 on the respective sides of the aircraft. The panels are preferably made from the same material as the envelope, however any lightweight flexible and airtight material known to a person having ordinary skill in the art may be used. These panels aid in the recovery of the low-density gas used in the LTA configuration. The partition bladders also reduce the possibility of catastrophic gas loss if the envelope integrity is compromised. In conjunction with the individual bladders, the aircraft also includes gas containers sufficient for one or more refills and a gas recovery pump system.

Base Structure

Figure 5A:
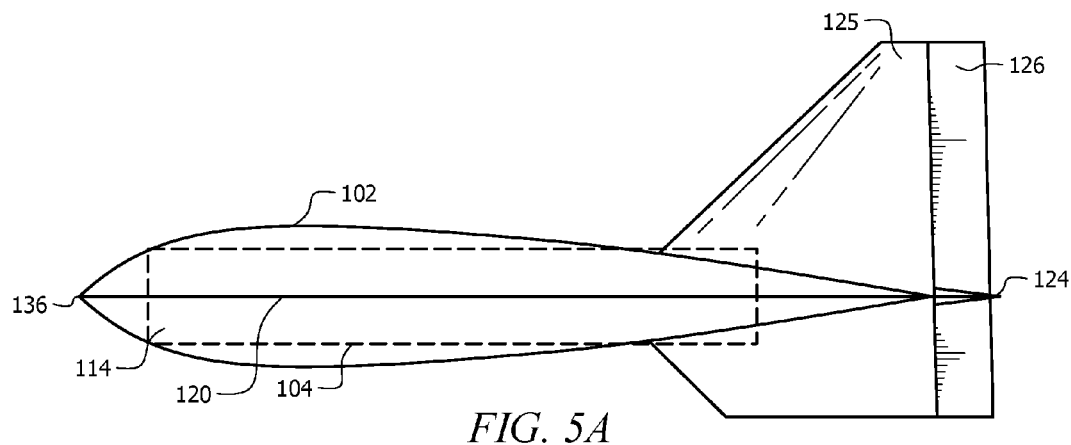
FIG. 5A is a side view of the present invention in the dash configuration.
Figure 5B:
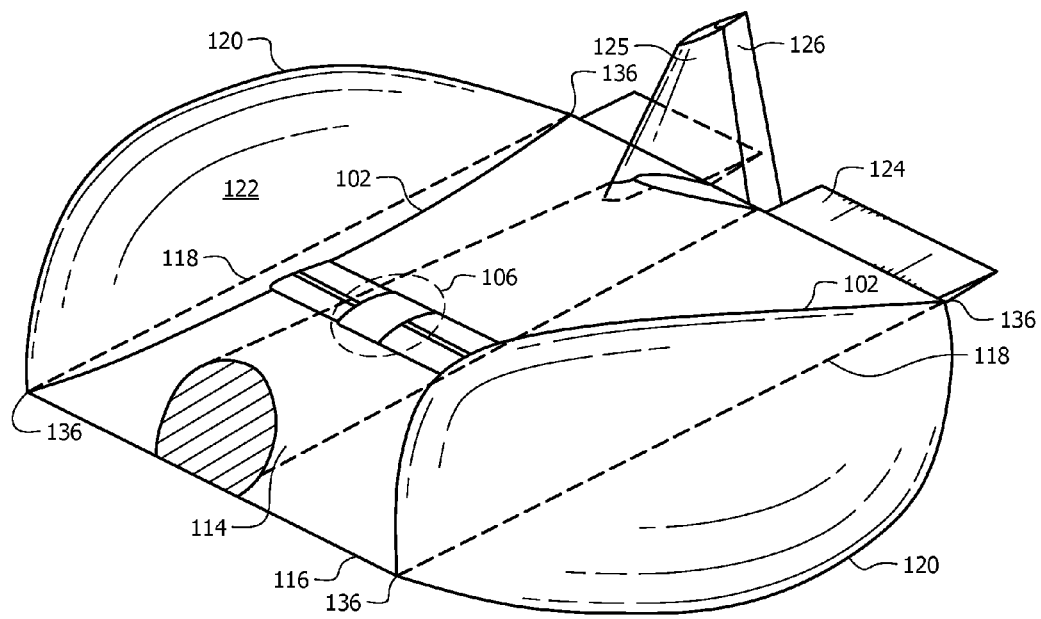
FIG. 5B is a perspective view of the present invention in the dash configuration.
Figure 5C:
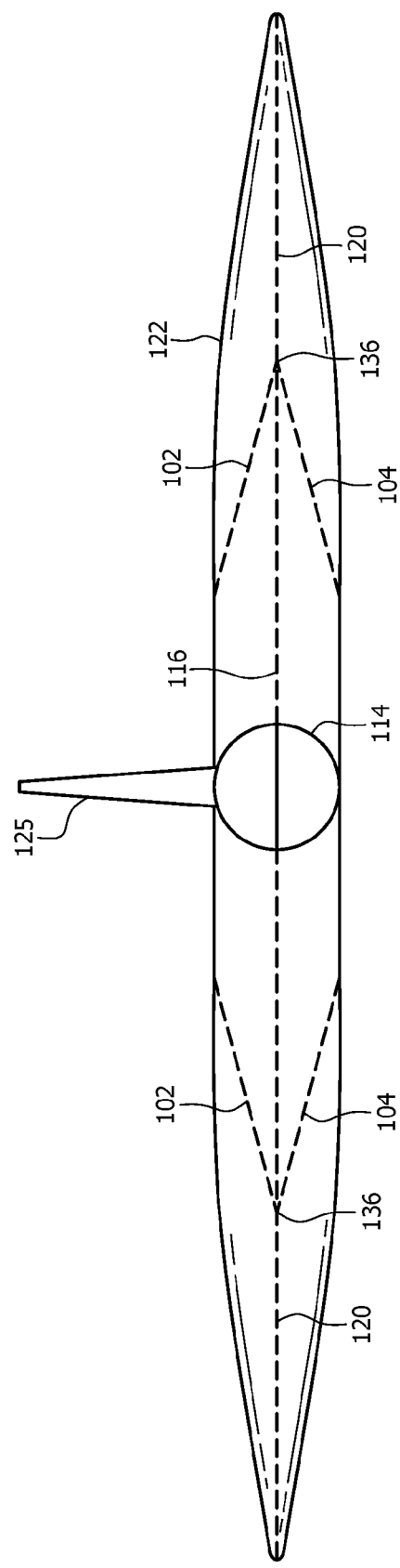
FIG. 5C is a front view of the present invention in the dash configuration.
Figure 5D:
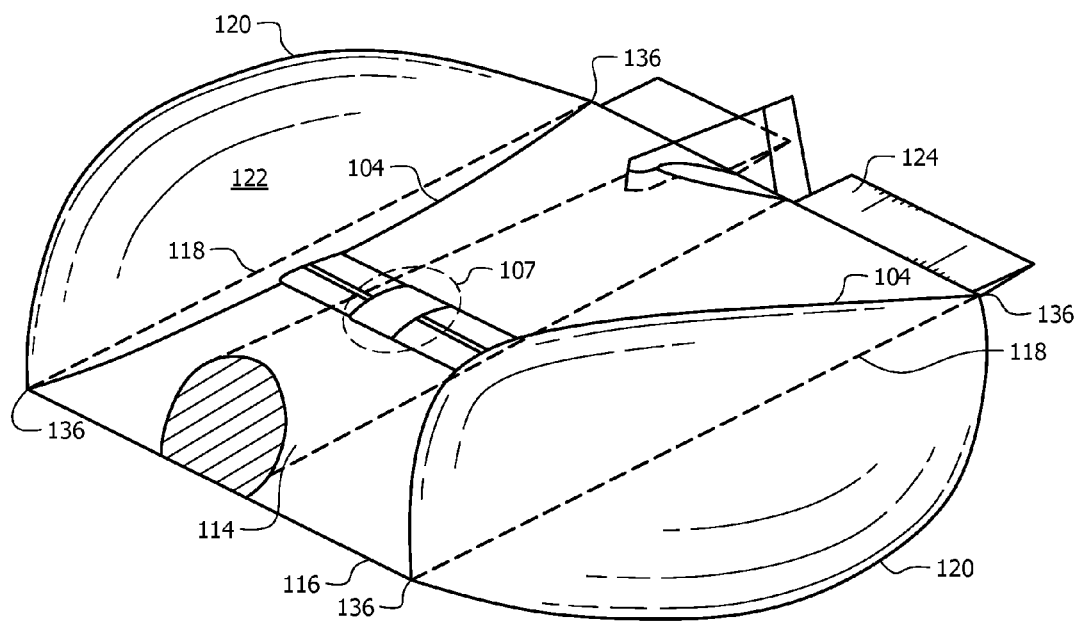
FIG. 5D is a bottom perspective view the present invention in the dash configuration.
Figure 11:
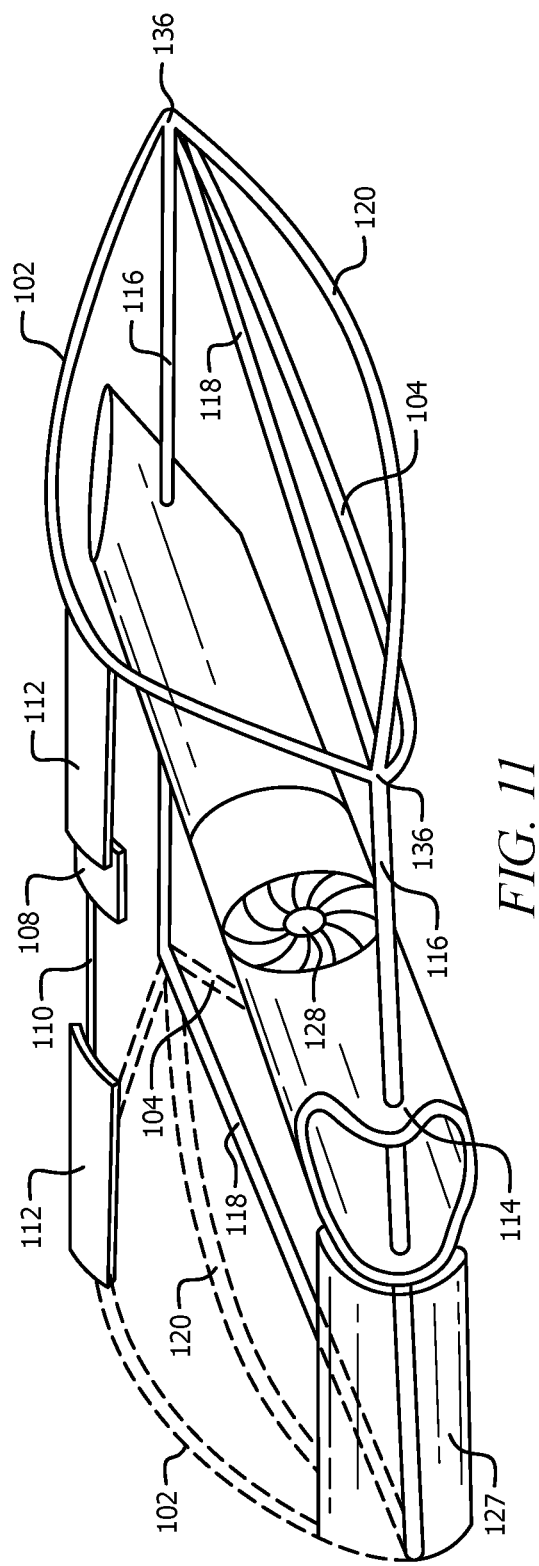
FIG. 11 is a perspective view of a certain embodiment of the present invention showing the internal structural components of the aircraft.

As shown in FIG. 11, the base structure of the aircraft includes a preferably rectangular frame made up of leading and trailing edge struts 116 connected to port and starboard outriggers 118. The structure also includes envelope expansion arms 120, which extend outward from the base structure on the port and starboard sides in a generally planar direction with respect to the base structure. A pair of moveable longerons—one moveable upper longeron 102 and one moveable lower longeron 104, is located on both the port and starboard sides of the aircraft. The longerons 102 and 104 and envelope expansion arms 120 are connected at two structural connection points 136 located on each side of the aircraft where the outriggers and struts are connected. Longerons 102 and 104 are moveable such that the longerons may be forced in towards core 114 of the aircraft as seen on the port side of the aircraft in FIG. 11. As the longerons move towards a more horizontal position, slack would be created in the envelop if it were not for the envelope expansion arms. Envelop expansion arms 120, are under a constant bias force directed away from core 114 and lengthen/extend outward in the direction of the bias force, which in turn keeps envelope 122 taught. The envelope expansion arms ultimately increase the span of the aircraft as seen in FIG. 5C.

FIG. 11 also illustrates, on the starboard side of the aircraft, the orientation of longerons 102 and 104 and envelope expansion arm 120 when the starboard translation assembly transitions to an expanded configuration. This configuration includes longerons 102 and 104 in a generally vertical orientation, which results in the envelope forcing envelope expansion arm 120 towards core 114 to overcome the predetermined bias force of envelope expansion arm 120.

Figure 12:
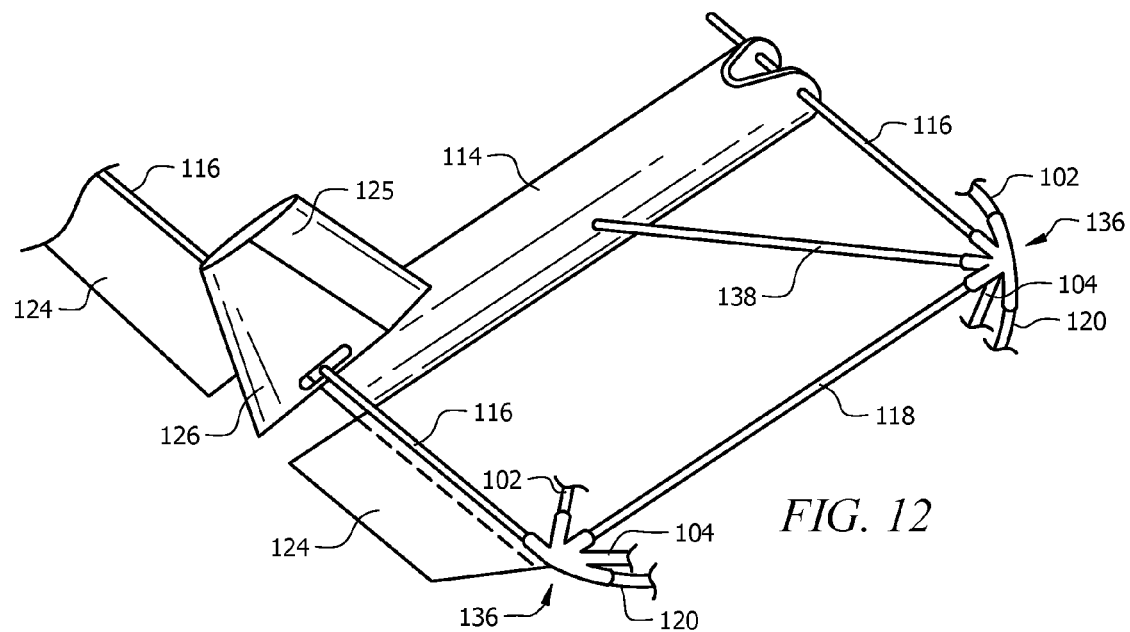
FIG. 12 is a rear perspective view of the starboard side of a certain embodiment of the present invention showing the internal structural components of the aircraft.

In an embodiment, as shown in FIG. 12, the base structure may include an additional support member 138. Support member 138 is included to increase the rigidity of the base structure and may be connected to the base structure at any location known to a person having ordinary skill in the art, such that the structure improves rigidity. Multiple support members may be included depending on aircraft configuration. It should be noted that the base structure would include support structure 138 on both the port and starboard sides of the aircraft, but FIG. 12 is limited to the starboard section of the aircraft to reduce clutter.

Also illustrated in FIG. 12 is the open space between core 114 and outrigger 118. This open space allows for the storage of the additional systems that will likely be used in operation. The additional systems are preferably mounted to the side of core 114 and may include, but are not limited to batteries, computation devices including the navigation system, control computer, battery charger and control device, navigation, servo motors, internal payload elements and structural components for the envelope.

Figure 13:
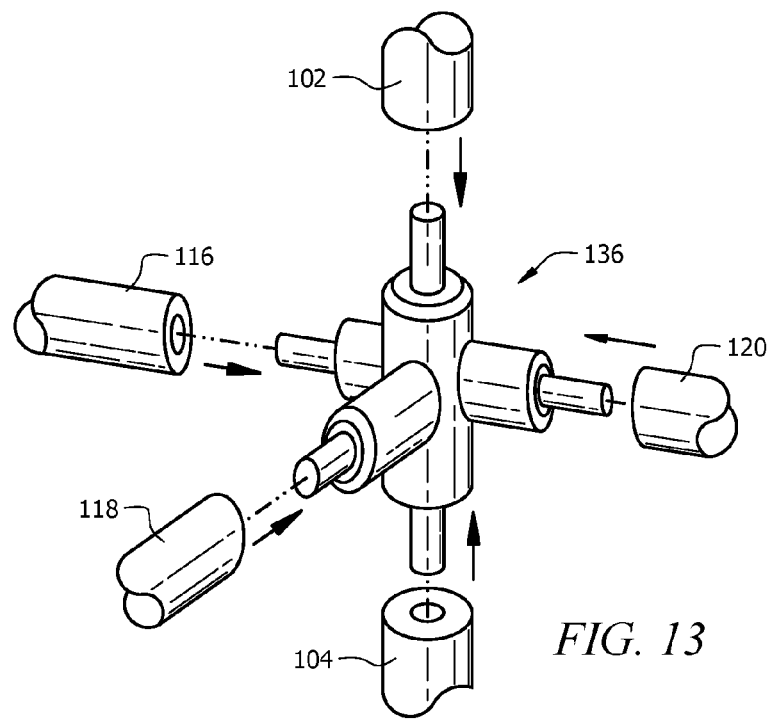
FIG. 13 is an exploded view of a certain embodiment of a structural connection point.

Referring now to FIG. 13, an embodiment of structural connection point 136 includes five connection excluding a connection for an additional support member. The connections of moveable longerons 102 and 104 and the connection for envelope expansion arm 120 are pivoting connections, such as ball joints. Strut 116 and outrigger 118 connections are preferably fixed connections. The pivoting connections for moveable longerons 102 and 104 and envelope expansion arm 120 aid in the convertibility of the aircraft. The fixed connections of strut 116 and outrigger 118 aid in the rigidity of the base structure to improve the aircraft's ability to operate under the typical forces and stresses associated with flight. In an embodiment, the connection for envelope expansion arm 120 is spring loaded to produce tension on envelope expansion arm 120 in turn transferring the tension onto the envelope; thereby removing slack in the dash configuration.

Figure 14A:
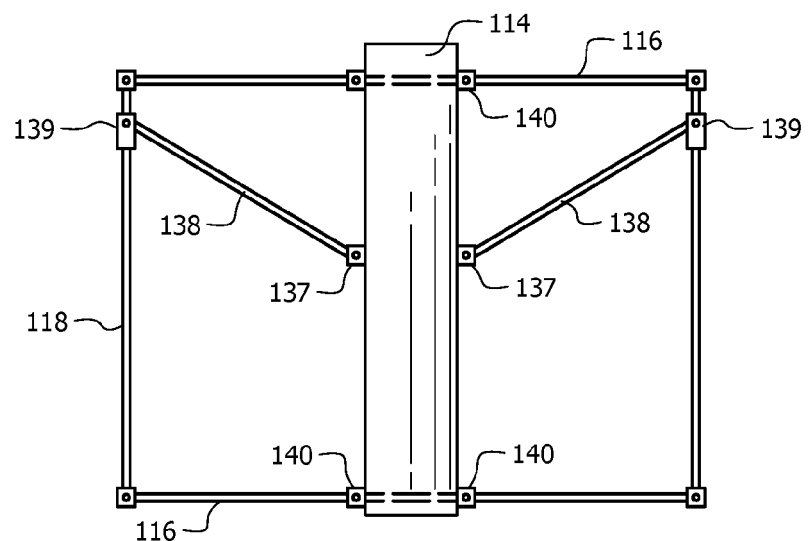
FIG. 14A is a top view of the internal base structure of a certain embodiment of the present invention.
Figure 14B:
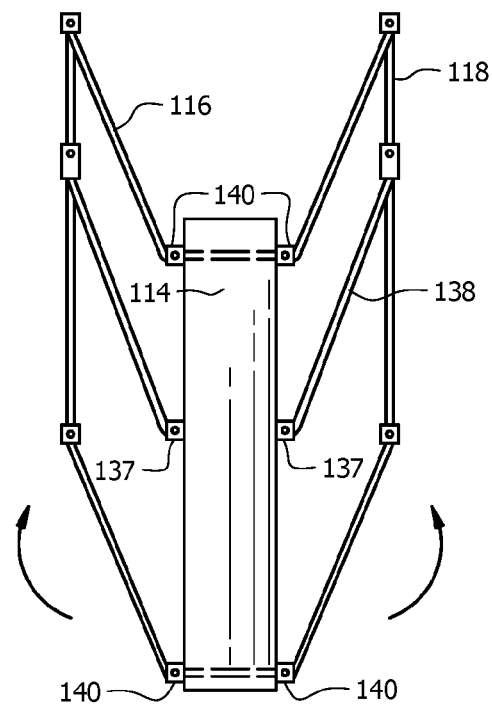
FIG. 14B is a top view of the internal base structure of a certain embodiment of the present invention shown in a folded configuration.

As shown in FIGS. 14A and 14B, an embodiment includes strut-core connection points 140 that pivotally connect struts 116 to core 114. Along with pivoting core-support member connection points 137, strut-core connection points 140 allow the base structure of the aircraft to fold to a more compact orientation and improve transportability of the aircraft. FIG. 14 also illustrate how an embodiment includes slideable outrigger-support member connection points 139 instead of the support member connection at the structural connection point. Slideable outrigger-support member connection point 139 slides along outrigger 118 to aid in folding the aircraft.

Figure 15:
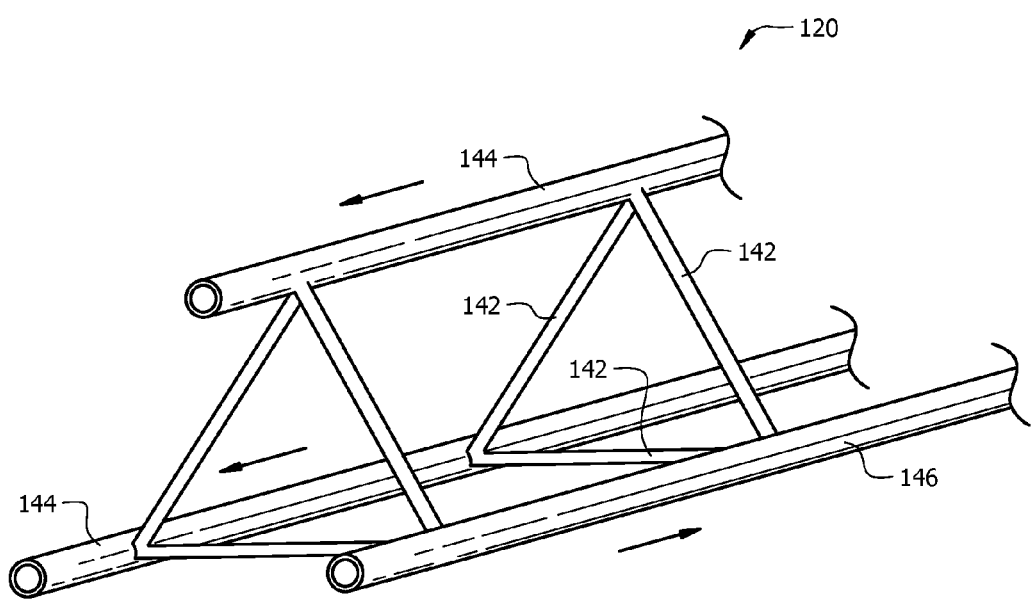
FIG. 15 is a certain embodiment of the envelope expansion arm.

FIG. 15 provides an embodiment of envelope expansion arm 120. On the smaller sized aircraft, tubes of the appropriate diameter telescope to permit the removal of slack in the flexible envelope to enable high speed flight with minimum envelope flutter. The tension is provided by spring loading features on the structural connection points 136 that connect envelope expansion arms 120, as discussed above. On larger versions, however, the telescoping tube design is likely be less effective than the use of a unique anisotropic beam design as shown in FIG. 15. The anisotropic beam includes two or more composite rods (preferably a three-rod configuration) with spring steel cross members embedded into the structure. The spring constant (controlled by material and length) will be varied across the length of the beam to provide variable tension on the envelope based on the pressure on the envelope. One or more of the composite rods will interface with the pivot joint assembly at both ends to provide the source of the tension while the other rod(s) will be anchored against the pivot structure. Any twisting or translation of the rods relative to each other is prevented by the spring steel cross members. The design allows different spring constants to be used along the length of the structure by adjusting the stiffness and lengths of the cross members so that pressure on the envelope at the tips and trailing edge can be significantly reduced while pressure at the leading edge can be maintained. This feature provides superior tension control with a lightweight structure and significantly reduces envelope flutter in the dash mode.

As illustrated in FIG. 15, the cross section of envelope expansion arm 120 is preferably triangular in shape with two rods 144 fixed to cross member trusses (made up of cross members 142) and a third rod 146 slidably attached to the cross member trusses. This unique assembly provides envelope expansion arm 120 with varying length capabilities while also allowing for varying structural support depending on the strength of the individual cross member trusses located along the length of envelope expansion arm 120.

Translation Assembly

Figure 16:
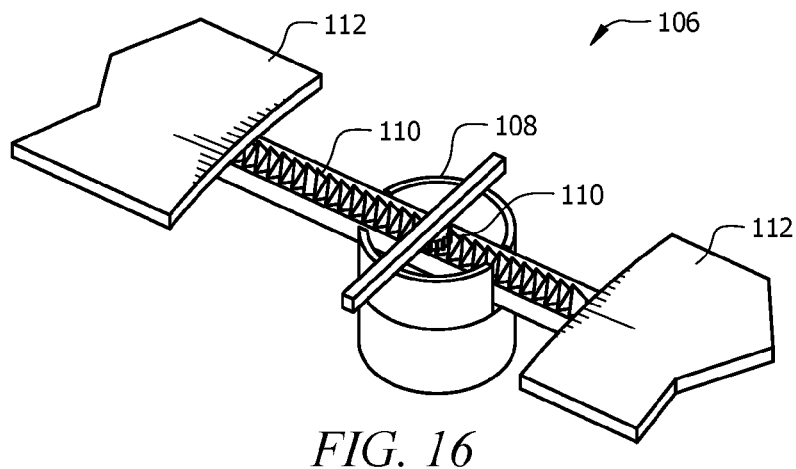
FIG. 16 is a perspective view of a certain embodiment of the upper translation assembly.
Figure 17A:
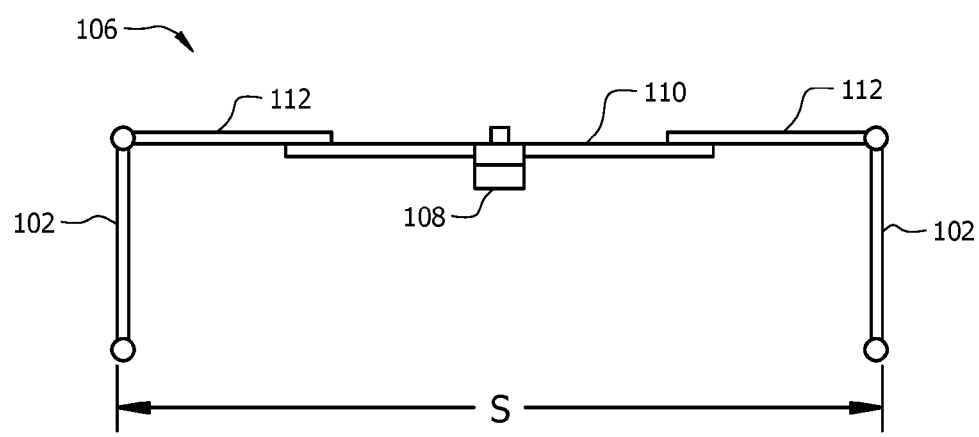
FIG. 17A is front view of a certain embodiment of the upper translation assembly in an extended configuration.
Figure 17B:
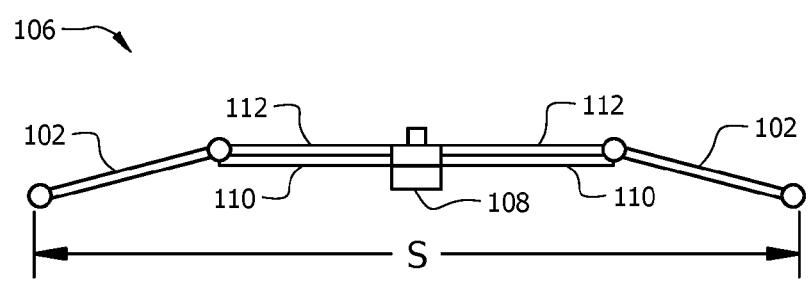
FIG. 17B is front view of a certain embodiment of the upper translation assembly in a retracted configuration.

Referring to FIG. 16, an embodiment of upper translation assembly 106 includes motor 108, gear assembly 110, and extendable arms 112. In an embodiment, the center of gear assembly 110 is attached to the envelope to aid in maintaining proper envelope positioning. As shown in FIG. 17A, extendable arms 112 are attached to upper moveable longerons 102 and when upper translation assembly 106 is in the extended configuration, upper moveable longerons 102 are in a generally vertical orientation. Contrastingly, FIG. 17B shows upper translation assembly 106 in the retracted configuration, with the moveable longerons 102 pulled inwardly towards motor 108.

Figure 18:
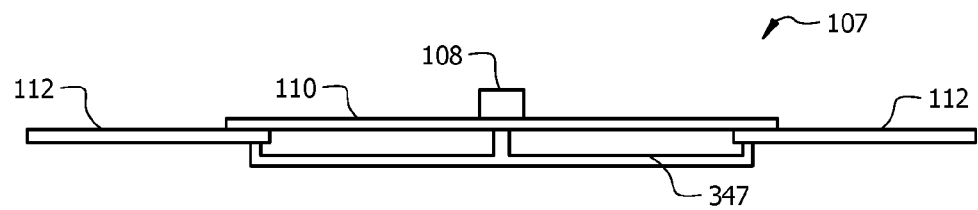
FIG. 18 is a front view of a certain embodiment of the lower translation assembly, having a payload hard point, while in an extended orientation.
Figure 19:
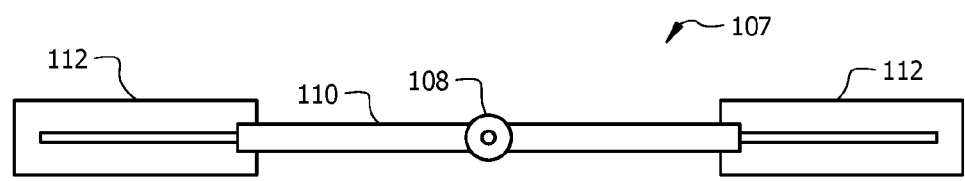
FIG. 19 is a top view of FIG. 18.
Figure 20:
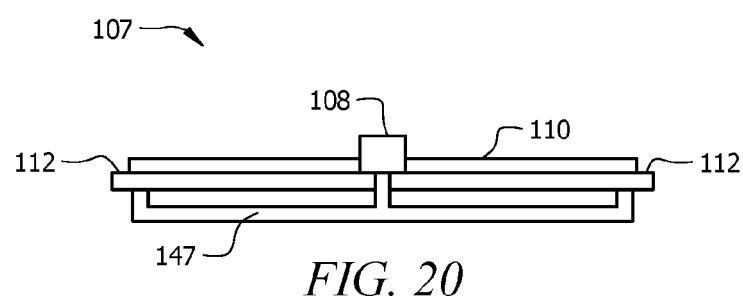
FIG. 20 is a front view of the lower translation assembly shown in FIG. 18 while in a retracted orientation.
Figure 21:
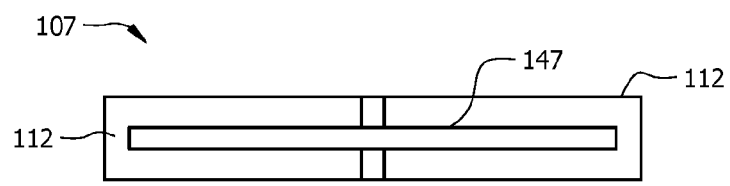
FIG. 21 is a bottom view of FIG. 20.

Referring now to FIGS. 18-21, an embodiment includes payload hard points 147 on translation assemblies 106 and 107. Most commonly, the hard point would be located on the lower translation assembly. FIGS. 18 and 19 show lower translation assembly 107 in the extended configuration and FIGS. 20 and 21 show the translation assembly in the retracted configuration. Payload hard points 147 provide an attachment structure for securing payloads to the aircraft. In an embodiment, payload hard point 147 on lower translation assembly 107 is externally located with respect to the envelope. In this embodiment, extendable arms 112 are in communication with lower moveable longerons inside of the envelope while payload hard point 147 extends downwards and out of the envelope allowing certain payloads to be attached outside of the envelope.

An embodiment of the aircraft may be equipped with flexible solar panels mounted to the upper exterior surface of the envelope to extended on station performance. This allows the aircraft to remain in the LTA configuration and hover while the system batteries are recharged. Energy recovery through the motor, when equipped, is also available while in buoyant mode if turned into an oncoming airstream.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An aircraft comprising:
   a flexible envelope that encloses a base structure, a pair of upper longeron rods and a pair of lower longeron rods with each longeron rod pivotally connected to the base structure, and a pair of envelope expansion arms;
   each upper longeron rod in the pair of upper longeron rods further including a curved shape extending between a fore end and an aft end with a vertex at the local maximum of the curved shape, wherein the curved shape extends away from a lateral axis of the aircraft to support the flexible envelope;
   each upper longeron rod in the pair of upper longeron rods further including being in communication with an upper translation assembly, the upper translation assembly adapted to pivot the upper longeron rod, thereby moving the vertex of the upper longeron rod towards or away from the lateral axis of the aircraft to alter a thickness of the aircraft;
   each lower longeron rod in the pair of lower longeron rods further including a curved shape extending between a fore end and an aft end with a vertex at a local maximum of the curved shape, wherein the curved shape extends away from the lateral axis of the aircraft to support the flexible envelope;
   each lower longeron rod in the pair of lower longeron rods further including being in communication with a lower translation assembly, the lower translation assembly adapted to pivot the lower longeron rod, thereby moving the vertex of the lower longeron rod towards or away from the lateral axis of the aircraft to alter the thickness of the aircraft; and
   the pair of envelope expansion arms including a first envelope expansion arm located at least partially on a starboard side of the aircraft and a second envelope expansion arm located at least partially on a port side of the aircraft.

2. The aircraft of claim 1, wherein the base structure includes a central core extending generally parallel to a central longitudinal axis of the aircraft, a leading edge strut extending in a direction perpendicular to and in communication with the central core, a trailing edge strut extending in a direction perpendicular to and in communication with the central core, a port side outrigger extending in a direction parallel to the central core and in communication with the leading and trailing edge struts, and a starboard side outrigger extending in a direction parallel to the central core and in communication with the leading and trailing edge struts.

3. The aircraft of claim 2, further including the flexible envelope sealing around a perimeter of an open front end of the core and also sealing around a perimeter an open back end of the core creating an open fluidic passage through the flexible envelope via the central core.

4. The aircraft of claim 1, further comprising a structural connection point having a first fixed connection attached to an outrigger, a second fixed connection attached to a strut, a first pivoting connection attached to one of the upper longeron rods, a second pivoting connection attached to one of the lower longeron rods, and a third pivoting connection attached to one of the envelope expansion arms.

5. The aircraft of claim 3, further including a propulsion system secured within the central core, such that the propulsion system receives incoming air through the open front end of the core to generate thrust, which exits the open back end of the core.

6. The aircraft of claim 1, wherein the pair of upper longeron rods includes a port side longeron rod and a starboard side longeron rod and the pair of lower longeron rods includes a port side lower longeron rod and a starboard side lower longeron rod.

7. The aircraft of claim 1, wherein the envelope expansion arm is an anisotropic beam including two or more composite rods with cross members having a predetermined spring constant embedded into the structure, one of the composite rods is pivotally attached to the aircraft and one or more of the composite rods is anchored against the pivot structure to provide a tension force.

8. The aircraft of claim 1, further including a span that increases when the envelope expansion arms are in an expanded position and decreases when the envelope expansion arms are in a retracted position.

9. The aircraft of claim 1, further comprising a lighter-than-air configuration, the lighter-than-air configuration including:
   each of the upper longeron rods is positioned so that each respective vertex is a maximum distance from the lateral axis of the aircraft, and each of the lower longeron rods is positioned so that each respective vertex is a maximum distance from the lateral axis of the aircraft, thereby increasing the thickness of the aircraft; and
   each envelope expansion arm is in a retracted position and the span of the aircraft is at a minimum value.

10. The aircraft of claim 1, further comprising a gas storage and retrieval system adapted to house, distribute, and retrieve lighter-than-air gas.

11. The aircraft of claim 1, further including a propulsion system having an electrical generator system adapted to convert wind energy into electrical energy while the aircraft is in a lighter-than-air configuration.

12. The aircraft of claim 1, wherein each envelope expansion arm further includes:
an adjustable length;
a biasing member imparting a constant bias force directed away from the longitudinal axis of the aircraft to increase the length of each envelope expansion arm which in turn increases the span of the aircraft;
a retracted position in which the length of the envelope expansion arm is at a minimum value and an expanded position in which the length of the envelope expansion arm is at a maximum value;
the retracted position is achieved when a tension force in the flexible envelope overcomes the constant bias force that results from pivoting the vertices of the upper and lower longerons away from the lateral axis of the aircraft; and
the expanded position is achieved when the tension force in the flexible envelope is overcome by the constant bias force that results from pivoting the vertices of the upper and lower longerons towards the lateral axis of the aircraft.

\* \* \* \* \*